US011661889B1

(12) United States Patent
Muldoon et al.

(10) Patent No.: US 11,661,889 B1
(45) Date of Patent: May 30, 2023

(54) HYDROGEN POWERED GEARED TURBO FAN ENGINE WITH AN OFF-SET REDUCED CORE

(71) Applicant: Raytheon Technologies Corporation, Farmington, CT (US)

(72) Inventors: Marc J. Muldoon, Marlborough, CT (US); Joseph B. Staubach, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/581,375

(22) Filed: Jan. 21, 2022

(51) Int. Cl.
*F02C 7/18* (2006.01)
*F02C 3/22* (2006.01)
*F02C 7/141* (2006.01)
*F02C 5/02* (2006.01)

(52) U.S. Cl.
CPC .............. *F02C 7/18* (2013.01); *F02C 3/22* (2013.01); *F02C 5/02* (2013.01); *F02C 7/141* (2013.01); *F05D 2220/323* (2013.01); *F05D 2240/35* (2013.01); *F05D 2250/312* (2013.01); *F05D 2260/213* (2013.01); *F05D 2260/232* (2013.01)

(58) Field of Classification Search
CPC ...... F02C 7/18; F02C 3/22; F02C 5/02; F02C 7/141; F02C 6/00; F02C 6/02; F05D 2220/323; F05D 2240/35; F05D 2250/312; F05D 2260/213; F05D 2260/232; F02K 3/12
See application file for complete search history.

(56) References Cited

U.S. PATENT DOCUMENTS

| | | | |
|---|---|---|---|
| 2,704,434 | A | 3/1955 | Schmitt |
| 3,368,352 | A | 2/1968 | Hewson |
| 6,508,052 | B1 | 1/2003 | Snyder et al. |
| 6,901,739 | B2 | 6/2005 | Chrstopherson |
| 8,365,514 | B1 | 2/2013 | Kupratis |
| 9,828,911 | B2 | 11/2017 | Burghardt |
| 10,024,235 | B2 | 7/2018 | Suciu et al. |
| 10,415,466 | B2 | 9/2019 | Suciu et al. |
| 11,022,313 | B2 | 6/2021 | Boardman et al. |
| 11,073,107 | B1 | 7/2021 | Kupratis et al. |
| 2006/0185346 | A1* | 8/2006 | Rolt ............... F02K 3/06 60/226.1 |
| 2010/0155526 | A1 | 6/2010 | Negulescu |
| 2012/0055168 | A1* | 3/2012 | Berry ............... F02C 3/28 60/39.463 |
| 2014/0074135 | A1 | 3/2014 | Hart et al. |

(Continued)

FOREIGN PATENT DOCUMENTS

EP 2915988 A1 9/2015
WO 2014074135 A1 5/2014

*Primary Examiner* — Jesse S Bogue
(74) *Attorney, Agent, or Firm* — Cantor Colburn LLP

(57) ABSTRACT

Aircraft propulsion systems include a fan shaft connected to a fan, the fan shaft defining a centerline axis of the aircraft propulsion system, one or more offset cores arranged at an angle to the centerline axis, the one or more offset cores each comprising a hydrogen burning combustor, a centerline cavity defined along the centerline axis, and a heat exchanger arranged within the centerline cavity. In operation, a portion of air is directed from the fan into the centerline cavity to provide a first working fluid to the heat exchanger within the centerline cavity.

19 Claims, 6 Drawing Sheets

(56) References Cited

U.S. PATENT DOCUMENTS

| | | | |
|---|---|---|---|
| 2015/0211416 A1* | 7/2015 | Chandler | F02C 6/06 60/39.15 |
| 2015/0247456 A1* | 9/2015 | Suciu | F02C 3/14 60/791 |
| 2015/0308339 A1* | 10/2015 | Forcier | F02C 7/32 60/226.1 |
| 2015/0337730 A1* | 11/2015 | Kupiszewski | F02C 7/16 60/39.465 |
| 2016/0115866 A1* | 4/2016 | Suciu | F01D 25/24 60/39.12 |
| 2016/0123226 A1* | 5/2016 | Razak | F02C 7/18 60/39.15 |
| 2019/0368370 A1* | 12/2019 | Chandler | F02K 3/06 |
| 2020/0025071 A1 | 1/2020 | Suciu et al. | |
| 2021/0231081 A1* | 7/2021 | Kupratis | F02C 6/206 |

\* cited by examiner

HYDROGEN POWERED GEARED TURBO FAN ENGINE WITH AN OFF-SET REDUCED CORE

TECHNICAL FIELD

The present disclosure relates generally to turbine engines and aircraft engines, and more specifically to turbo expanders, motors, and hybrid electric power for use when employing hydrogen fuel systems and related systems with turbine and aircraft engines.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, liquid fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF SUMMARY

According to some embodiments, aircraft propulsion systems are provided. The aircraft propulsion systems include a fan shaft connected to a fan, the fan shaft defining a centerline axis of the aircraft propulsion system, one or more offset cores arranged at an angle to the centerline axis, the one or more offset cores each comprising a hydrogen burning combustor, a centerline cavity defined along the centerline axis, and a heat exchanger arranged within the centerline cavity. A portion of air is directed from the fan into the centerline cavity to provide a first working fluid to the heat exchanger within the centerline cavity.

In addition to one or more of the features described above, or as an alternative, embodiments of the aircraft propulsion systems may include that the fan shaft is a low speed spool of a turbine engine.

In addition to one or more of the features described above, or as an alternative, embodiments of the aircraft propulsion systems may include a second heat exchanger arranged within the centerline cavity.

In addition to one or more of the features described above, or as an alternative, embodiments of the aircraft propulsion systems may include that the second heat exchanger is an oil-air heat exchanger.

In addition to one or more of the features described above, or as an alternative, embodiments of the aircraft propulsion systems may include that the second heat exchanger is an air-fuel heat exchanger.

In addition to one or more of the features described above, or as an alternative, embodiments of the aircraft propulsion systems may include one or more axial struts extending parallel with the engine axis and defining, in part, the centerline cavity.

In addition to one or more of the features described above, or as an alternative, embodiments of the aircraft propulsion systems may include that at least one axial strut comprises a centerline cavity inlet configured to receive the portion of air directed into the centerline cavity.

In addition to one or more of the features described above, or as an alternative, embodiments of the aircraft propulsion systems may include that at least one axial strut comprises a centerline cavity outlet configured to direct the portion of air directed into the centerline cavity into a bypass flow.

In addition to one or more of the features described above, or as an alternative, embodiments of the aircraft propulsion systems may include one or more radial struts configured to support at least one of the fan shaft and the fan.

In addition to one or more of the features described above, or as an alternative, embodiments of the aircraft propulsion systems may include that at least one radial strut comprises a radial strut aperture configured to direct the portion of air into the centerline cavity.

In addition to one or more of the features described above, or as an alternative, embodiments of the aircraft propulsion systems may include one or more hydrogen tanks configured to supply hydrogen to the one or more hydrogen burning combustors, wherein the hydrogen from the one or more hydrogen tanks is passed through the heat exchanger within the centerline cavity as a second working fluid.

According to some embodiments, aircraft are provided. The aircraft include an aircraft propulsion system having a fan shaft connected to a fan, the fan shaft defining a centerline axis of the aircraft propulsion system, one or more offset cores arranged at an angle to the centerline axis, the one or more offset cores each comprising a hydrogen burning combustor, a centerline cavity defined along the centerline axis, and a heat exchanger arranged within the centerline cavity. A portion of air is directed from the fan into the centerline cavity to provide a first working fluid to the heat exchanger within the centerline cavity. The aircraft further include aircraft systems comprising at least one hydrogen tank and an aircraft-systems heat exchanger arranged remote from the one or more offset cores. Hydrogen is supplied from the at least one hydrogen tank through a hydrogen flow path, passing through the aircraft-systems heat exchanger prior to being injected into the one or more hydrogen burning combustors for combustion.

In addition to one or more of the features described above, or as an alternative, embodiments of the aircraft may include that the fan shaft is a low speed spool of a turbine engine.

In addition to one or more of the features described above, or as an alternative, embodiments of the aircraft may include a second heat exchanger arranged within the centerline cavity.

In addition to one or more of the features described above, or as an alternative, embodiments of the aircraft may include that the second heat exchanger is one of a hydrogen-air heat exchanger, an oil-air heat exchanger, or an air-fuel heat exchanger.

In addition to one or more of the features described above, or as an alternative, embodiments of the aircraft may include one or more axial struts extending parallel with the centerline axis and defining, in part, the centerline cavity.

In addition to one or more of the features described above, or as an alternative, embodiments of the aircraft may include that at least one axial strut comprises a centerline cavity inlet configured to receive the portion of air directed into the centerline cavity.

In addition to one or more of the features described above, or as an alternative, embodiments of the aircraft may include that at least one axial strut comprises a centerline cavity outlet configured to direct the portion of air directed into the centerline cavity into a bypass flow.

In addition to one or more of the features described above, or as an alternative, embodiments of the aircraft may include one or more radial struts configured to support at least one of the fan shaft and the fan.

In addition to one or more of the features described above, or as an alternative, embodiments of the aircraft may include that at least one radial strut comprises a radial strut aperture configured to direct the portion of air into the centerline cavity.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
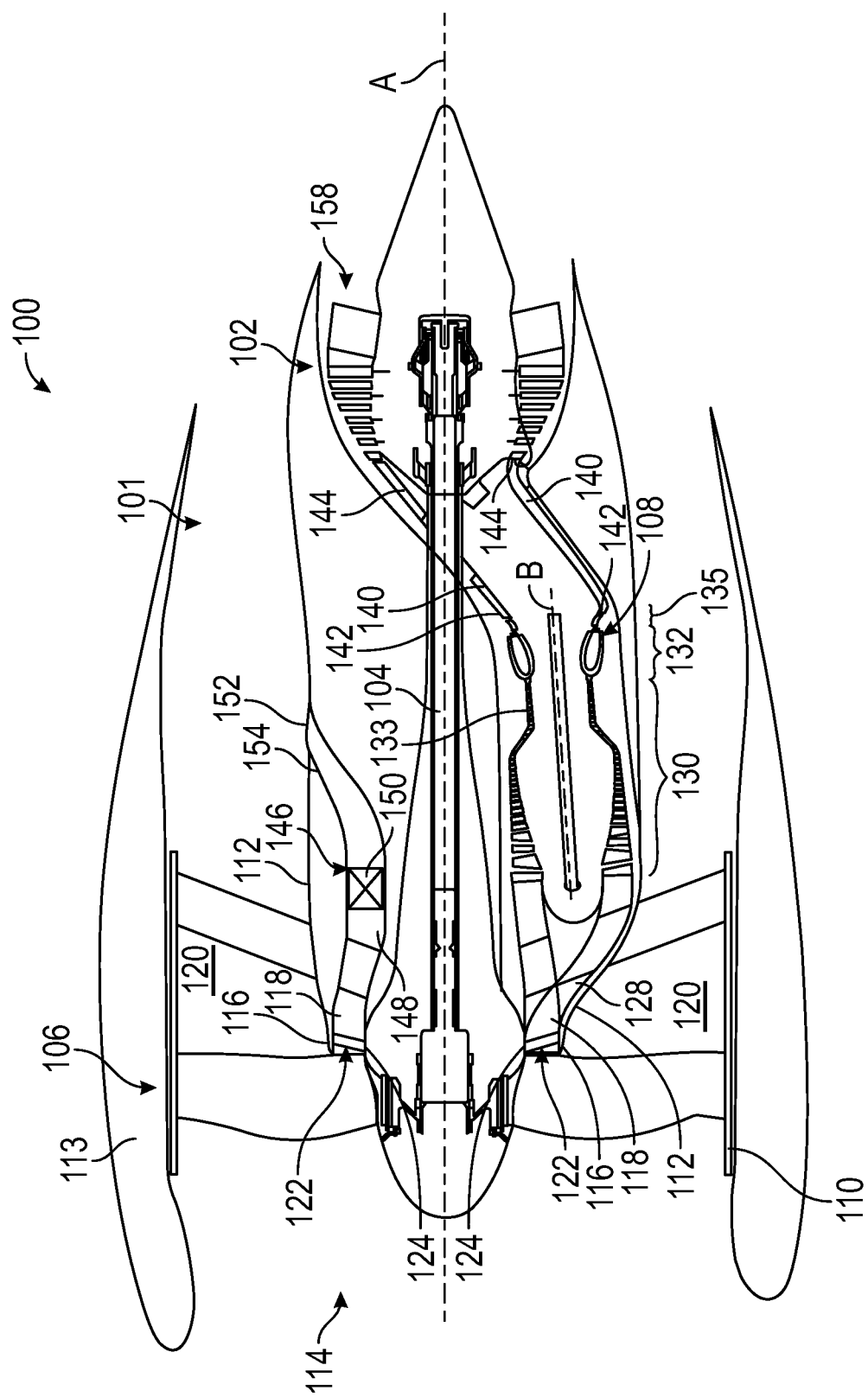
FIG. 1A is a schematic cross-sectional illustration of a turbine engine architecture that may incorporate embodiments of the present disclosure.
Figure 1B:
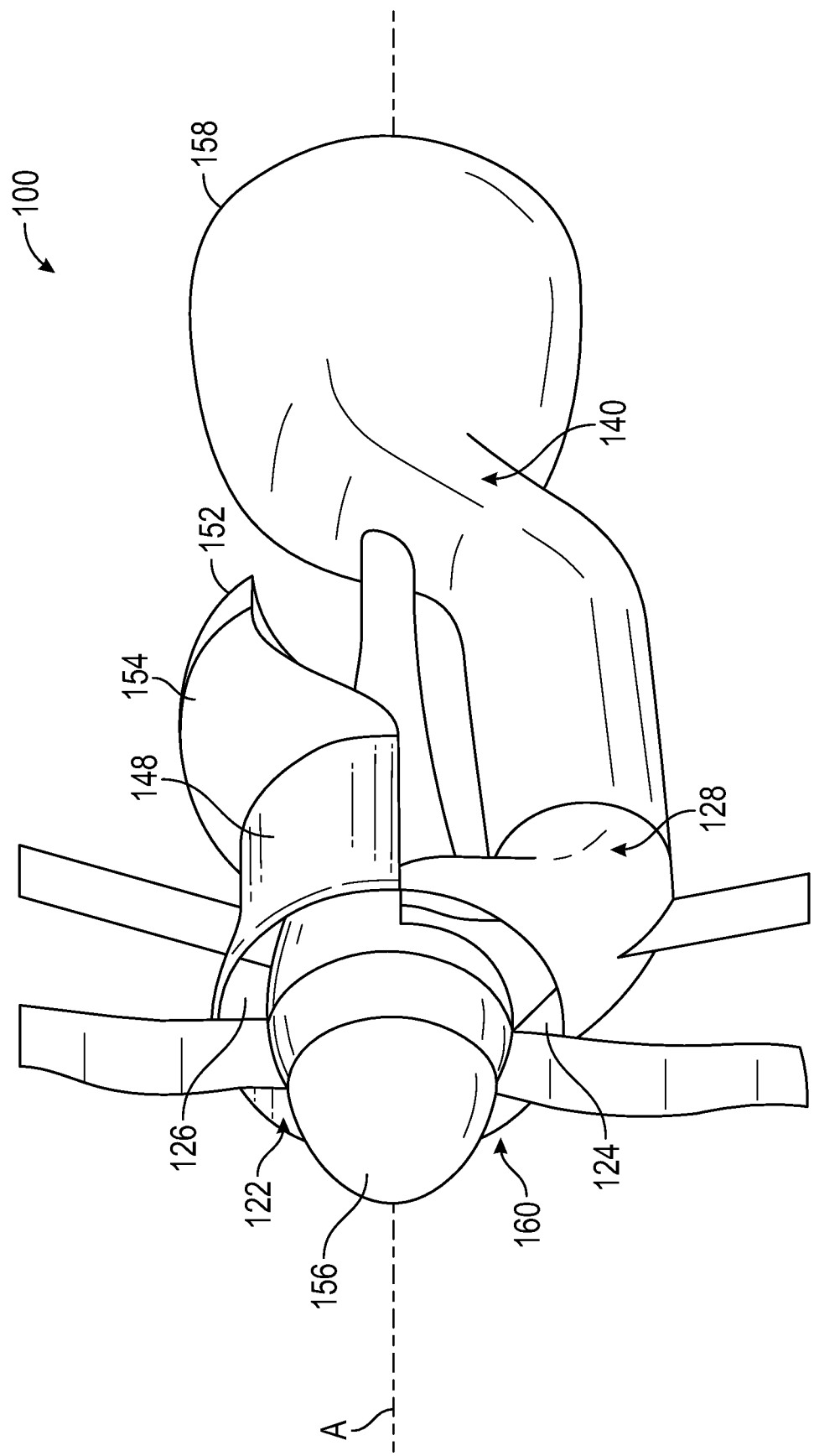
FIG. 1B is a schematic front perspective view of a portion of the turbine engine architecture of FIG. 1A, showing a core inlet segmented into first and second duct inlets.

Referring to FIGS. 1A-1B, a turbine engine architecture 100 includes a propulsor 101 having a power turbine 102 and a turbine shaft 104. The turbine shaft 104 extends forward from the power turbine 102 and defines a centerline axis A. The propulsor 101 also includes a fan 106 aligned with the centerline axis A forward of the power turbine 102 and is operatively connected to be driven by the power turbine 102 through the turbine shaft 104. A fan case 110 is defined radially outward of the fan 106 along the centerline axis A and includes a fan inlet 114. A nacelle 113 is defined radially outward of the fan case 110. An outer core cowl 112 is arranged radially inward of the fan case 110 and defines an axially extending splitter 116 for dividing fluid flow entering at the fan inlet 114 into a core gas path 118 and a bypass flow path 120. The core gas path 118 includes a core inlet 122 defined radially between the splitter 116 and an inner core cowl 124.

In the turbine engine architecture 100, a gas generator 108 is arranged downstream from the fan 106 along the core gas path 118 and aft of the core inlet 122. The gas generator 108 defines a generator axis B. The generator axis B is offset from the centerline axis A. In accordance with some non-limiting embodiments of the present disclosure, the generator axis B may be substantially parallel to the centerline axis A. The gas generator 108 includes a compressor section 130 aligned with the generator axis B. The compressor section 130 is operatively connected to the power turbine 102 by way of a combustor section 132 and a turbine section 135 to supply combustion products for driving the power turbine 102. The gas generator 108 includes a turbine shaft 133 defined along the generator axis B. Those skilled in the art will readily appreciate that this allows the turbine shaft 104 to be optimally sized for both torque and rotor-dynamics.

As shown in FIGS. 1A-1B, the turbine engine architecture 100 includes a transition duct 140 defined between an exhaust outlet 142 of the gas generator 108 (e.g., an outlet of turbine section 135) and an inlet 144 of the turbine 102 for providing fluid communication therebetween. The transition duct 140 is angled relative to the centerline axis A and the generator axis B. The offset gas generator 108 includes the compressor section 130, the combustor section 132, and the turbine section 135, and is operatively connected to the power turbine 102 that is configured to drive the fan 106. The exhaust from the gas generator 108 is ducted to the power turbine 102 through the transition duct 140, and the power turbine 102 drives the fan 106, either through a fan drive gear system (FDGS) or a direct drive, as will be appreciated by those of skill in the art. The exhaust flow from the gas generator 108 may be evenly distributed between the top and bottom halves of the transition duct 140 so that the exhaust flow uniformly feeds the power turbine 102.

As shown in FIG. 1B, the core inlet 122 is circumferentially segmented into a first duct inlet 124 and a second duct inlet 126. The gas generator 108, shown in FIG. 1A, is arranged in fluid communication with the core inlet 122 and the first duct inlet 124 through a first duct 128. The first duct inlet 124 is defined in a bottom half 160 of the core inlet 122. At least a portion of the first duct 128 is angled relative to the centerline axis A and the generator axis B, shown in FIG. 1A. The turbine engine architecture 100 includes a hub 156 defined forward of the core inlet 122. The hub 156 can be configured to direct flow to the first and second duct inlets 124, 126, respectively. The first and second duct inlets 124, 126 are configured to apportion incoming fluid flow evenly between the first duct inlet 124 and the second duct inlet 126. While the first and second duct inlets 124, 126 are shown herein as being divided evenly, those skilled in the art will appreciate that the proportions of the first duct inlet 124 and the second duct inlet 126 can vary as needed for a given application.

In this illustrative architecture, and as shown in FIGS. 1A-1B, the second duct inlet 126 is in fluid isolation from the gas generator 108. It is contemplated that by segmenting the core inlet 122, the second portion of air not needed for the gas generator 108 can be diverted into the second duct inlet 126 which can be used for a variety of suitable purposes. For example, a thermal management system 146 may use the diverted flow. In this illustrative configuration, the thermal management system 146 includes a heat-exchanger 150 and is defined in a second duct 148 between the second duct inlet 126 and a second duct outlet 152 (e.g., an exhaust outlet). The thermal management system 146 is arranged in fluid communication with the core gas path 118 and the second duct inlet 126 through the second duct 148. By having the second duct inlet 126 and the second duct 148, air flow distortions around the hub 156 tend to be mitigated as compared to if the air flow was taken into the first duct inlet 124 alone. For example, if air flow was taken into the first duct inlet 124 and there was no inlet on the top half of the hub 156 (e.g., second duct inlet 126), there would be significant fluid distortion (e.g., variation in flow rate and/or pressure) around the circumference of the hub 156 and/or the fan 106. Such fluid distortion tends to factor into the propulsor efficiency which can potentially cause negative performance results in the engine. By drawing an equal amount air flow from the top of the hub 156, the distortion downstream of the fan 106 is mitigated, reducing performance losses.

With continued reference to FIGS. 1A-1B, the second duct 148 includes an exhaust portion 154 with an exhaust outlet 152 separate from and upstream of an exhaust outlet 158 of the power turbine 102. The exhaust portion 154 is angled relative to the centerline axis A. The exhaust outlet 152 is in fluid communication with the bypass duct 120 for discharging the air flow thereto. Those skilled in the art will appreciate that while the second duct 148 is described herein as having the thermal management system 146 disposed therein, there are a variety of suitable auxiliary components and systems that can be disposed in the second duct 148. For example, the air flow can be utilized as part of an anti-ice system, an environmental control system, and/or any other suitable auxiliary components and systems. It is contemplated that the above described components and systems can be disposed directly in the second duct 148 and/or operatively connected thereto.

The embodiment shown and described with respect to FIGS. 1A-1B may be a gas turbine engine that is configured to burn or combust jet fuel or other hydrocarbon-based fuel. However, other engine configurations are possible, without departing from the scope of the present disclosure. For example, hydrogen or other alternative fuel systems may be implemented with embodiments of the present disclosure.

Figure 2:
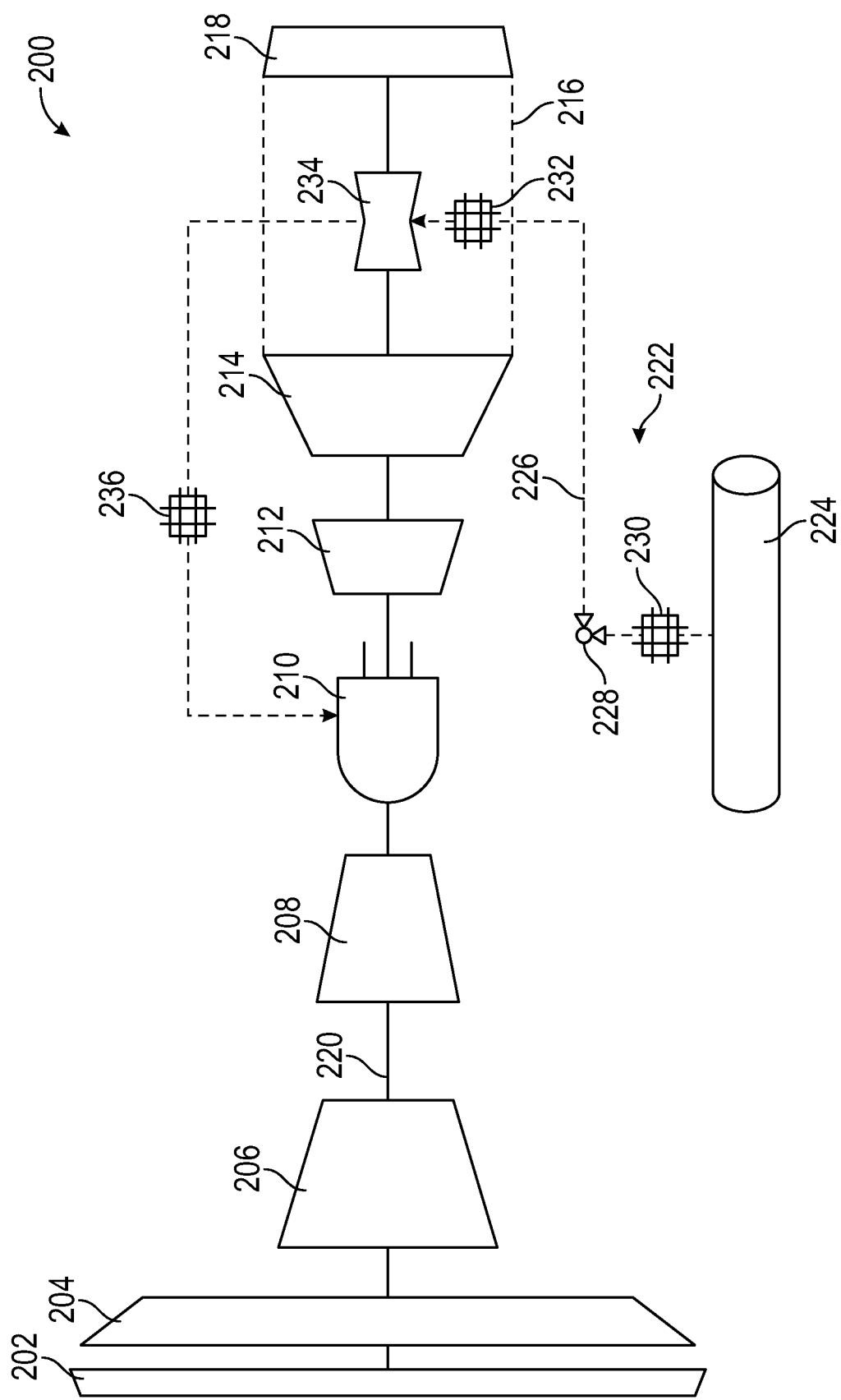
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above but is configured to employ a non-hydrocarbon fuel source, such as hydrogen. The turbine engine system 200 includes an inlet 202, a fan 204, a low pressure compressor 206, a high pressure compressor 208, a combustor 210, a high pressure turbine 212, a low pressure turbine 214, a core nozzle 216, and an outlet 218. A core flow path is defined through, at least, the compressor 206, 208, the turbine 212, 214, and the combustor sections 210. The compressor 206, 208, the turbine 212, 214, and the fan 204 are arranged along a shaft 220.

As shown, the turbine engine system 200 includes a hydrogen fuel system 222. The hydrogen fuel system 222 is configured to supply a hydrogen fuel from a hydrogen fuel tank 224 to the combustor 210 for combustion thereof. In this illustrative embodiment, the hydrogen fuel may be supplied from the hydrogen fuel tank 224 to the combustor 210 through a fuel supply line 226. The fuel supply line 226 may be controlled by a flow controller 228 (e.g., pump(s), valve(s), or the like). The flow controller 228 may be configured to control a flow through the fuel supply line 226 based on various criteria as will be appreciated by those of skill in the art. For example, various control criteria can include, without limitation, target flow rates, target turbine output, cooling demands at one or more heat exchangers, target flight envelopes, etc.

As shown, between the cryogenic fuel tank 224 and the flow controller 228 may be one or more heat exchangers 230, which can provide cooling to various systems onboard an aircraft by using the hydrogen as a cold-sink. Such hydrogen heat exchangers 230 may be configured to warm the hydrogen and aid in a transition from a liquid state to a supercritical fluid or gaseous state for combustion within the combustor 210. The heat exchangers 230 may receive the hydrogen fuel directly from the hydrogen fuel tank 224 as a first working fluid and a component-working fluid for a different onboard system as a second working fluid. For example, the heat exchanger 230 may provide cooling to power electronics of the turbine engine system 200 (or other aircraft power electronics). In other embodiments, the arrangement of the heat exchanger 230 and the flow controller 228 (or a flow controller element, such as a pump) may be reversed. In some such embodiments, a pump, or other means to increase a pressure of the hydrogen sourced from the hydrogen fuel tank 224, may be arranged upstream of the heat exchanger 230. This pumping or pressure increase may be provided to pump the hydrogen to high pressure as a liquid (e.g., low power). It will be appreciated that other configurations and arrangements are possible without departing from the scope of the present disclosure.

In some non-limiting embodiments, an optional secondary fluid circuit may be provided for cooling one or more aircraft loads. In this secondary fluid circuit, a secondary fluid may be configured to deliver heat from the one or more aircraft loads to one or more liquid hydrogen heat exchangers. As such, heating of the hydrogen and cooling of the secondary fluid may be achieved. The above described configurations and variations thereof may serve to begin raising a temperature of the hydrogen fuel to a desired temperature for efficient combustion in the combustor 210.

The hydrogen may then pass through an optional supplemental heating heat exchanger 236. The supplemental heating heat exchanger 236 may be configured to receive hydrogen as a first working fluid and as the second working fluid may receive one or more aircraft system fluids, such as, without limitation, engine oil, environmental control system fluids, pneumatic off-takes, or cooled cooling air fluids. As such, the hydrogen will be heated, and the other fluid may be cooled. The hydrogen will then be injected into the combustor 210 through one or more hydrogen injectors or nozzles, as will be appreciated by those of skill in the art.

When the hydrogen is directed along the flow supply line 226, the hydrogen can pass through a core flow path heat exchanger 232 (e.g., an exhaust waste heat recovery heat exchanger) or other type of heat exchanger. In this embodiment, the core flow path heat exchanger 232 is arranged in the core flow path downstream of the combustor 210, and in some embodiments, downstream of the low pressure turbine 214. In this illustrative embodiment, the core flow path heat exchanger 232 is arranged downstream of the low pressure turbine 214 and at or proximate the core nozzle 216 upstream of the outlet 218. As the hydrogen passes through the core flow path heat exchanger 232, the hydrogen will pick up heat from the exhaust of the turbine engine system 200. As such, the temperature of the hydrogen will be increased.

The heated hydrogen may then be passed into an expansion turbine 234. As the hydrogen passes through the expansion turbine 234 the hydrogen will be expanded. The process of passing the hydrogen through the expansion turbine 234 cools the hydrogen and extracts useful power through the expansion process. Because the hydrogen is heated from a cryogenic or liquid state in the hydrogen fuel tank 224 through the various mechanisms along the flow supply line 226, combustion efficiency may be improved.

Figure 3:
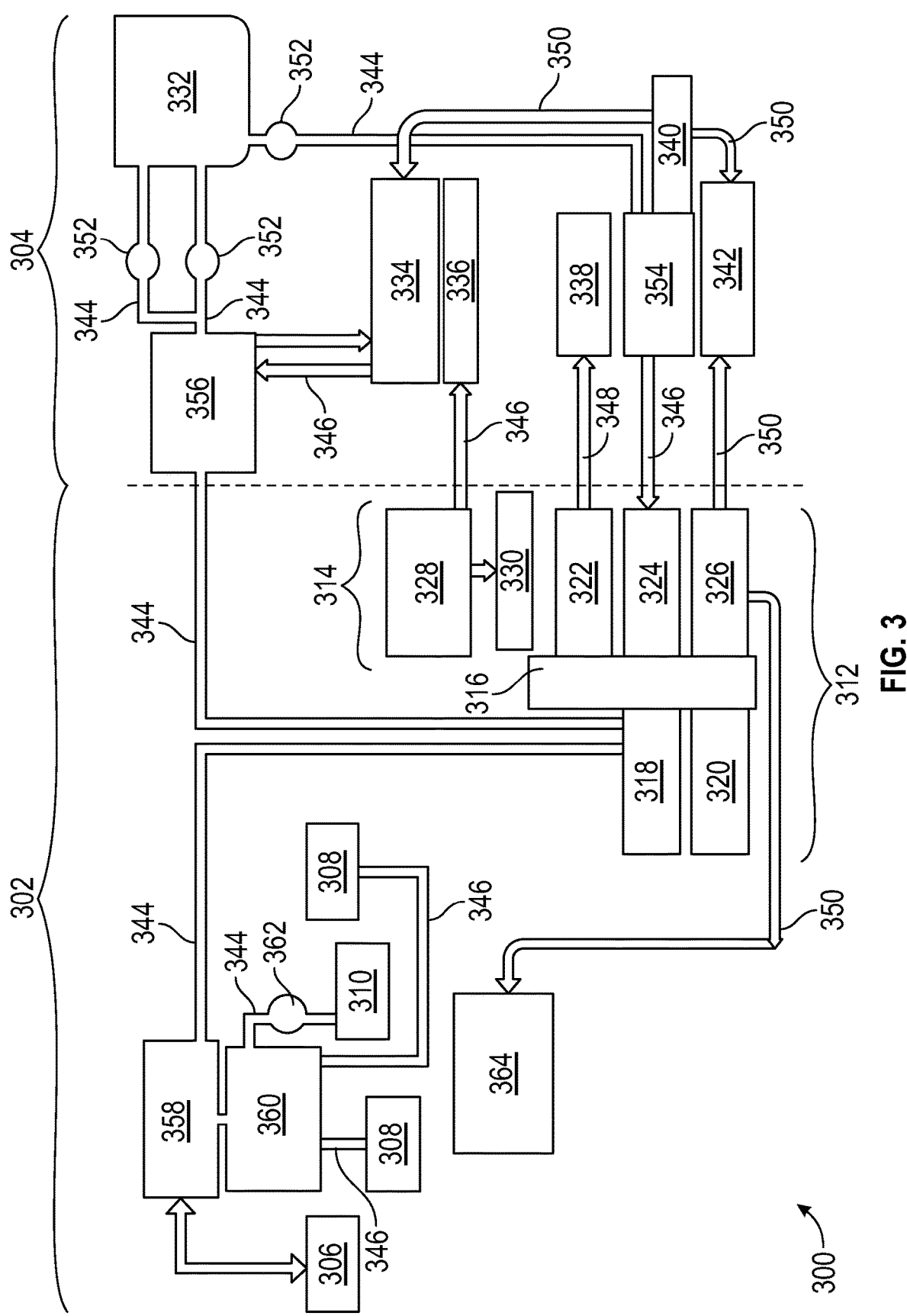
FIG. 3 is a schematic diagram of an aircraft propulsion system in accordance with an embodiment of the present disclosure.

Turning now to FIG. 3, a schematic diagram of an aircraft propulsion system 300 is shown. The aircraft propulsion system 300 includes engine systems 302 and aircraft systems 304. In accordance with embodiments of the present disclosure, the engine systems 302 include components, devices, and systems that are part of an aircraft engine, which may be wing-mounted or fuselage-mounted and the aircraft systems 304 are components, devices, and systems that are located separately from the engine, and thus may be arranged within various locations on a wing, within a fuselage, or otherwise located onboard an aircraft.

The engine systems 302 may include the components shown and described above, including, without limitation, a fan section, a compressor section, a combustor section, a turbine section, and an exhaust section. In this schematic illustration, without limitation, the engine systems 302 include an engine oil system 306, an air cooling system 308, a burner 310 (e.g., part of a combustion section), a gear box system 312, and an anti-ice system 314. Those of skill in the art will appreciate that other systems, components, and devices may be incorporated into the engine system 302, and the illustrative embodiment is merely for explanatory and illustrative purposes. The gear box system 312, as shown, includes a main gear box 316 with various components operably connected thereto. In this illustrative embodiment, a hydrogen high pressure pump 318, an oil pump 320, a hydraulic pump 322, an air turbine starter 324, and a generator 326 may all be operably connected to the main gear box 316 of the gear box system 312. The anti-ice system 314 of the engine systems 302 includes an engine bleed system 328 that is configured to supply warm air to a cowl anti-ice system 330 to prevent ice buildup on an engine cowl.

The aircraft systems 304 include various features installed and present that are separate from but may be operably or otherwise connected to one or more of the engine systems 302. In this illustrative, non-limiting configuration, the aircraft systems 304 include one or more hydrogen tanks 332 configured to store liquid hydrogen onboard the aircraft, such as in tanks that are wing-mounted or arranged within an aircraft fuselage. The aircraft systems 304 include a cabin air cooling system 334, a wing anti-ice system 336, flight controls 338, one or more generators 340, and aircraft power systems 342.

The schematic diagram in FIG. 3 of the aircraft propulsion system 300 illustrates flow paths for different working fluids. For example, a hydrogen flow path 344 represents a flow path of liquid (or supercritical or gaseous) hydrogen from the hydrogen tanks 332 to the burner 310. One or more air flow paths 346 represent airflow used for cooling and heat exchange with the hydrogen, and thus one or more heat exchangers or exchange systems may be provided to cause heat transfer from the air to the hydrogen, to cool the air and warm the hydrogen. A hydraulic fluid flow path 348 is illustrated fluidly connecting the hydraulic pump 322 to the flight controls 338. An electrical path 350 illustrates power generated by the generator 326 and distribution of such power (e.g., from generators 326, 340 to aircraft power systems 342 and other electrical systems onboard an aircraft). As shown, one or more of the paths 344, 346, 348, 350 may cross between the engine systems 302 and the aircraft systems 304.

Referring to the hydrogen flow path 344, liquid hydrogen may be sourced or supplied from the hydrogen tanks 332. One or more pumps 352 may be arranged to boost a pressure of the hydrogen as it is supplied from the hydrogen tanks 332. In some configurations, the pumps 352 may be low pressure pumps, providing an increase in pressure of about 20 psid to 50 psid, for example. The hydrogen may be supplied to one or more combustion systems. For example, a portion of the hydrogen may be supplied to an auxiliary power source 354, such as an auxiliary power unit having a burner or a fuel cell. The auxiliary power source 354 may be configured to direct air to the air turbine starter 346 along a leg of an air flow path 346. Further, the auxiliary power source 354 may be configured to generate power at the generator 340 to supply power to the aircraft power system 342 and/or the cabin air cooling system 334 and other ECS systems and/or other aircraft systems that use electrical power.

For propulsion onboard the aircraft, a portion of the hydrogen is supplied from the hydrogen tanks 332 along the hydrogen flow path 344 to a first heat exchanger 356 which may include a hydrogen-air heat exchanger to cool air. One or more low pressure pumps 352 may be arranged to boost a pressure and thus heat the hydrogen before entering the first heat exchanger 356. The first heat exchanger 356 may be part of an environmental control system (ECS) of the aircraft. The cooled air may be supplied, for example, to the cabin air cooling system 334. As this air is cooled, the hydrogen will be warmed within the first heat exchanger 356. The warmed hydrogen may then be passed through the hydrogen high pressure pump 318 which may further increase the pressure of the warmed hydrogen to maintain a pressure above a combustor pressure and/or above a critical pressure in order to avoid a phase change to gas in the plumbing, piping, flow path, or heat exchangers, for example.

The boosted pressure hydrogen may then be conveyed to a second heat exchanger 358. The second heat exchanger 358 may be a hydrogen-oil heat exchanger to cool engine oil of the engine systems 302. As such, the second heat exchanger 358 may be part of a closed loop of the engine oil system 306. In the second heat exchanger 358, the temperature of the hydrogen is further raised. Next, the hydrogen may be passed through a third heat exchanger 360. The third heat exchanger 360 may be a hydrogen-air heat exchanger. The third heat exchanger 360 may be part of an engine cooling system to supply air from one section of the engine systems 302 to another part of the engine systems 302 (e.g., from compressor section to turbine section, from turbine section to compressor section, etc.). The cooled air generated in the third heat exchanger 360 may be used for cooling air (e.g., for a turbine) and/or for buffer air within compartments of the engine systems 302. The third heat exchanger 360 may thus use warm engine air for heating the hydrogen, but also cooling such air for air-cooling schemes of the engine systems 302. A valve 362 may be arranged to control a flow of the heated hydrogen into the burner 310. In some embodiments, and as shown, an electric compressor actuator 364 may be included within the engine systems 302. The electric compressor actuator 364 may be configured to boost a pressure of the hydrogen prior to injection into the burner 310.

Using the architecture illustrated in FIG. 3, and in accordance with embodiments of the present disclosure, the hydrogen may be used as a heat sink to provide increased cooling capacity as compared to other cooling schemes. For Example, using liquid or supercritical hydrogen can, in some configurations, provide up to ten times the cooling capacity of prior systems. The hydrogen may be used at various locations along the hydrogen flow path 344 to provide cooling to one or more systems, as noted above. For example, the hydrogen can provide cooling to onboard electronics, generators, air for cooling purposes, etc. The pumps 318, 352 act to increase the pressure of the hydrogen. Use of low pressure pumps (e.g., pumps 352) can allow cooling of cooler heat sources at lower pressure (e.g., onboard electronics), whereas a high pressure pump (e.g., pump 318) can be used for higher pressure heat sources (e.g., generators 326, 340). Further, because the hydrogen is low temperature at the first heat exchanger 356, the hydrogen may act as an efficient heat sink for air. As such, the cabin air conditioning system 334 and other aspects of onboard ECS can be reduced in size, weight, and complexity.

It will be appreciated that the aircraft propulsion system 300 is an air breathing system. That is, the combustion of the hydrogen within the burner 310 is a mixture of pure hydrogen supplied from the hydrogen tanks 332 into the burner 310 where it is combusted in the presence of air pulled into the engine through a fan or the like. The aircraft propulsion system 300 may be substantially similar in construction and arrangement to a hydrocarbon-burning system (e.g., conventional gas turbine engine) that burns, for example, jet fuel. The turbine of the aircraft propulsion system 300 is thus driven by an output of the burner, similar to a conventional gas turbine engine. Because the aircraft propulsion system 300 is an air-breathing system that relies upon combustion, a flow rate of the hydrogen into the burner 310, as controlled in part by the valve 362, may be relatively low (e.g., around 0.2 pounds per second at cruise or around 0.025 pounds per second at minimum idle).

As described herein, aircraft propulsion systems are described that include a main engine core and a hydrogen fuel source, with the main engine core configured to burn the hydrogen to drive rotation of components of the main engine core. For example, the main engine core can include, at least, a compressor section, a combustor section, and a turbine. The main engine core is air breathing, and the combustor section is configured to burn a mixture of hydrogen (sourced from onboard hydrogen tanks) and air. The combustion output is used to drive rotation of the turbine section, which in turn drives rotation of the compressor section. As such, in view of the above description, the engine systems described with respect to FIG. 3 may be considered part of or components of the main engine core. Separate, yet connected, systems are part of the aircraft systems, which are remote from the engine systems. As described above, the engine systems may be wing mounted or fuselage installed, whereas the aircraft systems may be distributed about all other aspects of an aircraft (e.g., wings, cabins, cockpit, fuselage, etc.).

Embodiments of the present disclosure are directed to using hydrogen as a fuel in an offset core configuration. In some such configurations, the combustors that burn the hydrogen fuel are not arranged along the shaft/centerline of the engine. Rather, in accordance with embodiments of the present disclosure, the hydrogen burning combustor(s) are angled or offset from the engine centerline. A cavity or space is defined around a centerline axis (e.g., an imaginary axis through a centerline of the engine architecture). This centerline cavity can be used, in accordance with embodiments of the present disclosure, to install one or more engine components, such as heat exchangers. In accordance with some embodiments, when a heat exchanger is installed in the centerline cavity, a portion of engine bypass air can be directed into the centerline cavity to provide for air cooling and/or heat removal by passing the bypass air through the heat exchangers in the centerline cavity. By offsetting the combustors, engine core constraints based on the low spool may be eliminated. For example, use of "small" cores with a sufficiently small diameter and a low spool shaft for a roughly 30K lb. thrust turbofan could not be packaged concentrically due to strength and rotor-dynamics restrictions. In accordance with a non-limiting example of the present disclosure, a 30K lb. thrust engine in the 11-14 BPR ratio range may include an outer core case diameter of approximately 20 inches or less. Moreover, because the combustor(s) are configured to burn hydrogen, reduced size combustor(s) and increased room in the centerline cavity may be achieved. Additionally, inclusion of one or more intercooler heat exchangers within the centerline cavity along the fan shaft with a portion of the fan air directed into the core region can be used as a working fluid in the heat exchangers adding cooling efficiencies.

Figure 4A:
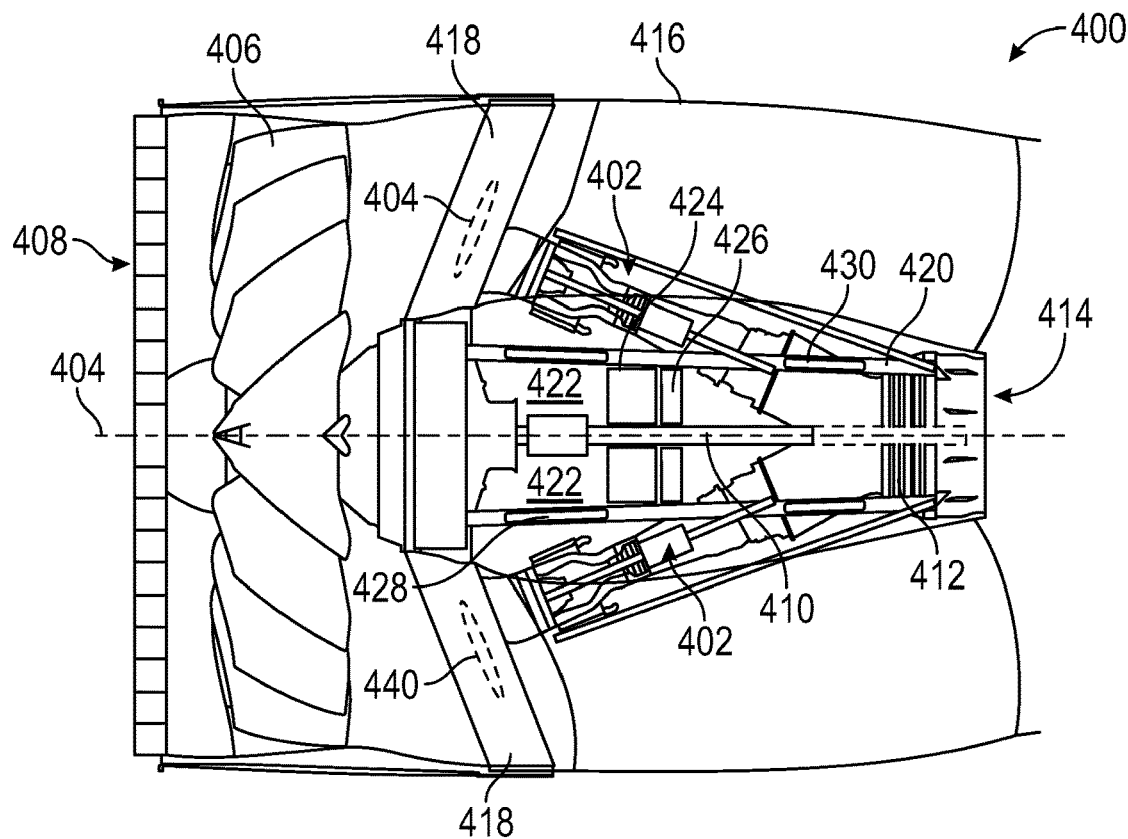
FIG. 4A is a side-elevation schematic illustration of an aircraft propulsion system in accordance with an embodiment of the present disclosure.
Figure 4B:
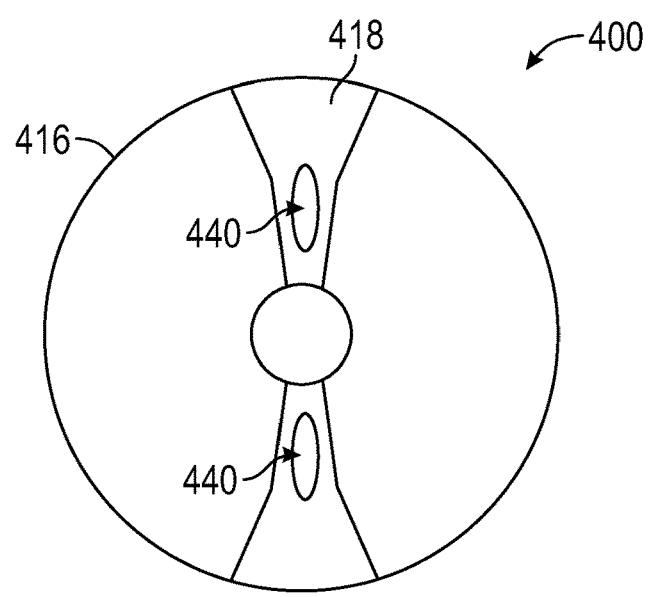
FIG. 4B is a front-elevation schematic illustration of the aircraft propulsion system of FIG. 4A.
Figure 4C:
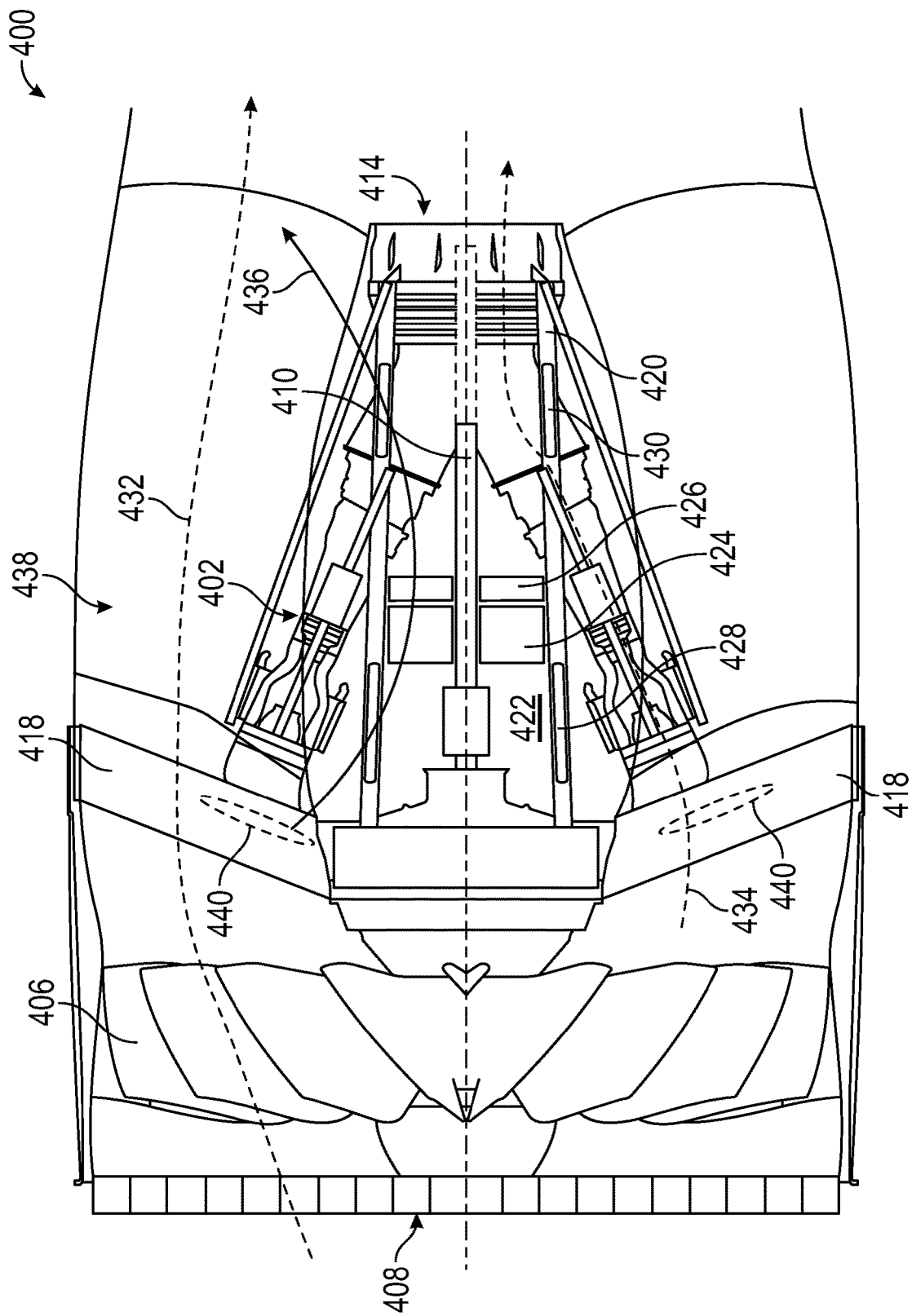
FIG. 4C is a schematic illustration of the aircraft propulsion system of FIG. 4A illustrating airflow therethrough.

Turning now to FIGS. 4A-4C, schematic illustrations of an aircraft propulsion system 400 in accordance with an embodiment of the present disclosure are shown. The aircraft propulsion system 400 may be a hydrogen burning system having components similar to that shown and described above. The illustrations of FIGS. 4A-4C illustrate some of the components and features of an engine system of the aircraft propulsion system 400. The aircraft propulsion system 400 includes one or more offset cores 402, which may include a high speed spool, a compressor section, a turbine section, and a combustor configured to burn hydrogen. The aircraft propulsion system 400 defines a centerline axis 404 and the offset cores 402 are angled relative to the centerline axis 404. The offset core(s) 402 may, for example, be configured as shown and described above with respect to FIGS. 1A-1B.

A fan 406 is arranged at an inlet 408 of the aircraft propulsion system 400 which is rotationally driven by a fan shaft 410. The fan shaft 410 may be arranged along the centerline axis of the aircraft propulsion system 400. The fan shaft 410 is driven by rotation of a turbine 412 arranged proximate to an outlet 414 of the aircraft propulsion system 400. The fan 406, the offset cores 402, the fan shaft 410, and other components of the aircraft propulsion system 400 are arranged within an engine housing 416, such as a nacelle, and may be structurally supported within the engine housing 416 by one or more radial struts 418.

One or more axial struts 420 extend parallel with the fan shaft 410 and the centerline axis 404. The axial struts 420 can, in part, provide structural support for the offset cores 402 and for the aircraft propulsion system 400 as whole. The axial struts 420 extend generally between the outlet 414 and the inlet 408. The axial struts 420 define a centerline cavity 422 about the centerline axis 404. The centerline cavity 422 is a space that, with the shifting of the offset cores 402 from being arranged along the fan shaft 410, provides for an opportunity to house structures for other systems of the aircraft propulsion system 400. The centerline cavity 422 may be defined, at least in part, radially inward from the offset cores 402 with respect to the centerline axis 404.

For example, as shown in FIG. 4A, a first heat exchanger 424 and a second heat exchanger 426 may be arranged within the centerline cavity 422. These heat exchangers 424, 426 may be configured to interact with air passing through the centerline cavity 422 of the aircraft propulsion system 400. In some embodiments, the heat exchangers 424, 426 may be part of a cryogenic fuel system that is configured to supply hydrogen or other cryogenic fuel to combustors of the offset cores 402. For example, in some configurations, the heat exchangers 424, 426 may be arrange as the heat exchangers 358, 360 are arranged in the configuration of FIG. 3, or other heat exchangers of such aircraft propulsion systems. In other configurations, the heat exchangers 424, 426 may be arranged to provide cooling or heat removal for other fluids, such as working fluids used onboard the aircraft propulsion system 400 (e.g., engine oil, cooling fluids for electronic systems, cooling for environmental control systems or other onboard aircraft uses, and the like).

The heat exchangers 424, 426 may be mounted or supported on the axial struts 420. The axial struts 420 may include a centerline cavity inlet 428 and a centerline cavity outlet 430. As shown in FIG. 4C, the aircraft propulsion system 400 defines a bypass flow 432, a core flow 434, and a centerline cavity flow 436. The bypass flow 432 flows through the inlet 402, interacts with the fan 406, passes by the radial struts 418, and bypasses the central core of the aircraft propulsion system 400, through a bypass duct 438. The core flow 434 enters through the inlet 408, passes through the radial struts 418, passing through radial strut apertures 440, and into the offset cores 402 to drive operation of the offset cores 402 (e.g., interact with turbines/compressors/combustors, etc.), and then exits through the outlet 414 of the aircraft propulsion system 400. A portion of the bypass flow 432 may be directed into and through the centerline cavity 422 to form the centerline cavity flow 436. The centerline cavity flow 436 will pass from the inlet 408, through the radial strut apertures 440 and/or around the radial struts 418, enter into the centerline cavity 422 through the centerline cavity inlet 428, interact with components therein (e.g., heat exchangers 424, 426), exit the centerline cavity 422 through the centerline cavity outlet 430, and then remerge with the bypass flow 432 to exit the aircraft propulsion system 400 at the outlet 414.

The aircraft propulsion system 400 takes advantage of the arrangement of the offset cores 402 and implements intercooler heat exchangers within the centerline cavity 422 of the aircraft propulsion system 400. These heat exchangers 424, 426 are air cooled using ambient air that is passed through the aircraft propulsion system 400. In some embodiments, the fan shaft 410 may be a low spool shaft that is operably connected to the fan 406 to drive rotation thereof. In use with a cryogenic burning system, the heat exchangers 424, 426 may be used to heat or cool (depending on what is necessary) the fuel prior to injection into the combustors of the offset cores 402. Further, as noted, the heat exchangers 424, 426 may be used to provide thermal conditioning (e.g., heating or cooling) to other working fluids of the aircraft propulsion system 400. Although shown in this embodiment with two heat exchangers, those of skill in the art will appreciate that a few as one heat exchanger and more than two heat exchangers (e.g., three, four, five, etc.) may be arranged within the centerline cavity. Further, in configurations with multiple heat exchangers, each heat exchanger or subgroups thereof may be configured for different purposes, such as thermal conditioning for a fuel for one or more heat exchangers and other heat exchangers arranged to provide thermal conditioning for other fluids (e.g., oil, refrigerants, water, air, or other fluids used on the aircraft propulsion system and/or the associated aircraft).

Advantageously, embodiments of the present disclosure are directed to improved turbine engine systems that employ non-hydrocarbon fuels at cryogenic temperatures. In accordance with some embodiments, the systems described herein provide for improved thermal conditioning, weight, and sizing as compared to prior configurations. For example, one or more heat exchangers may be positioned within a centerline cavity to provide conditioning through the heat exchangers due to the offset cores. In accordance with some embodiments of the present disclosure, the offset cores may be reduced in size as compared to conventional core configurations. For example, "small" cores, as employed herein, are cores with a sufficiently small diameter that a low spool shaft for a roughly 30K lb. thrust turbofan could not be packaged concentrically due to strength and rotor-dynamics restrictions. This may occur for 30K lb. thrust engines in the 11-14 BPR ratio range with an outer core case diameter of approximately 20 inches or less.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An aircraft propulsion system, comprising:
a fan shaft connected to a fan, the fan shaft defining a centerline axis of the aircraft propulsion system;

one or more offset cores arranged at an angle to the centerline axis, the one or more offset cores each comprising a hydrogen burning combustor;

a centerline cavity defined along the centerline axis;

one or more axial struts extending parallel with the centerline axis and defining, in part, the centerline cavity; and a heat exchanger arranged within the centerline cavity;

wherein a portion of air is directed from the fan into the centerline cavity to provide a first working fluid to the heat exchanger within the centerline cavity, and wherein at least one axial strut of the one or more axial struts comprises a centerline cavity inlet configured to receive the portion of air directed into the centerline cavity.

2. The aircraft propulsion system of claim 1, wherein the fan shaft is a low speed spool of a turbine engine.

3. The aircraft propulsion system of claim 1, further comprising a second heat exchanger arranged within the centerline cavity.

4. The aircraft propulsion system of claim 3, wherein the second heat exchanger is an oil-air heat exchanger.

5. The aircraft propulsion system of claim 3, wherein the second heat exchanger is an air-fuel heat exchanger.

6. The aircraft propulsion system of claim 1, further comprising one or more radial struts configured to support at least one of the fan shaft and the fan.

7. The aircraft propulsion system of claim 6, wherein at least one radial strut comprises a radial strut aperture configured to direct the portion of air into the centerline cavity.

8. The aircraft propulsion system of claim 1, further comprising one or more hydrogen tanks configured to supply hydrogen to the one or more hydrogen burning combustors, wherein the hydrogen from the one or more hydrogen tanks is passed through the heat exchanger within the centerline cavity as a second working fluid.

9. An aircraft comprising:
an aircraft propulsion system comprising:
a fan shaft connected to a fan, the fan shaft defining a centerline axis of the aircraft propulsion system;
one or more offset cores arranged at an angle to the centerline axis, the one or more offset cores each comprising a hydrogen burning combustor;
a centerline cavity defined along the centerline axis;
one or more axial struts extending parallel with the centerline axis and defining, in part, the centerline cavity; and
a heat exchanger arranged within the centerline cavity;
wherein a portion of air is directed from the fan into the centerline cavity to provide a first working fluid to the heat exchanger within the centerline cavity; and
aircraft systems comprising at least one hydrogen tank and an aircraft-systems heat exchanger arranged remote from the one or more offset cores;
wherein hydrogen is supplied from the at least one hydrogen tank through a hydrogen flow path, passing through the aircraft-systems heat exchanger prior to being injected into the one or more hydrogen burning combustors for combustion, and
wherein at least one axial strut of the one or more axial struts comprises at least one of (i) a centerline cavity inlet configured to receive the portion of air directed into the centerline cavity and (ii) a centerline cavity outlet configured to direct the portion of air directed into the centerline cavity into a bypass flow.

10. The aircraft of claim 9, wherein the fan shaft is a low speed spool of a turbine engine.

11. The aircraft of claim 9, further comprising a second heat exchanger arranged within the centerline cavity.

12. The aircraft of claim 11, wherein the second heat exchanger is one of a hydrogen-air heat exchanger, an oil-air heat exchanger, or an air-fuel heat exchanger.

13. The aircraft of claim 9, further comprising one or more radial struts configured to support at least one of the fan shaft and the fan.

14. The aircraft of claim 13, wherein at least one radial strut comprises a radial strut aperture configured to direct the portion of air into the centerline cavity.

15. An aircraft propulsion system, comprising:
a fan shaft connected to a fan, the fan shaft defining a centerline axis of the aircraft propulsion system;
one or more offset cores arranged at an angle to the centerline axis, the one or more offset cores each comprising a hydrogen burning combustor;
a centerline cavity defined along the centerline axis;
one or more axial struts extending parallel with the centerline axis and defining, in part, the centerline cavity; and
a heat exchanger arranged within the centerline cavity;
wherein a portion of air is directed from the fan into the centerline cavity to provide a first working fluid to the heat exchanger within the centerline cavity, and
wherein at least one axial strut of the one or more axial struts comprises a centerline cavity outlet configured to direct the portion of air directed into the centerline cavity into a bypass flow.

16. The aircraft propulsion system of claim 15, wherein the fan shaft is a low speed spool of a turbine engine.

17. The aircraft propulsion system of claim 15, further comprising a second heat exchanger arranged within the centerline cavity.

18. The aircraft propulsion system of claim 15, further comprising one or more radial struts configured to support at least one of the fan shaft and the fan.

19. The aircraft propulsion system of claim 15, further comprising one or more hydrogen tanks configured to supply hydrogen to the one or more hydrogen burning combustors, wherein the hydrogen from the one or more hydrogen tanks is passed through the heat exchanger within the centerline cavity as a second working fluid.

* * * * *